2,967,807
ELECTROLYTIC DECOMPOSITION OF SODIUM CHLORIDE

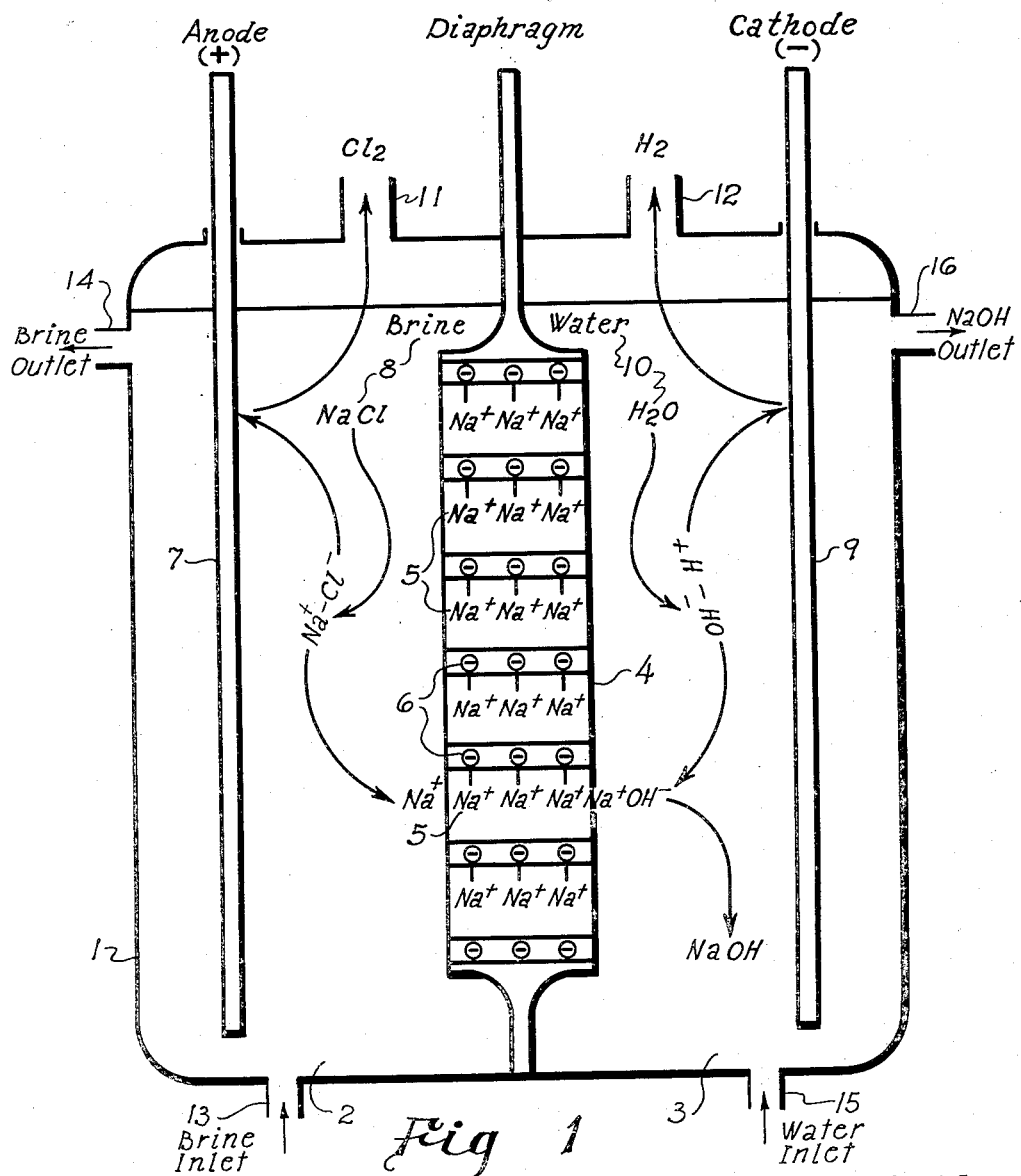

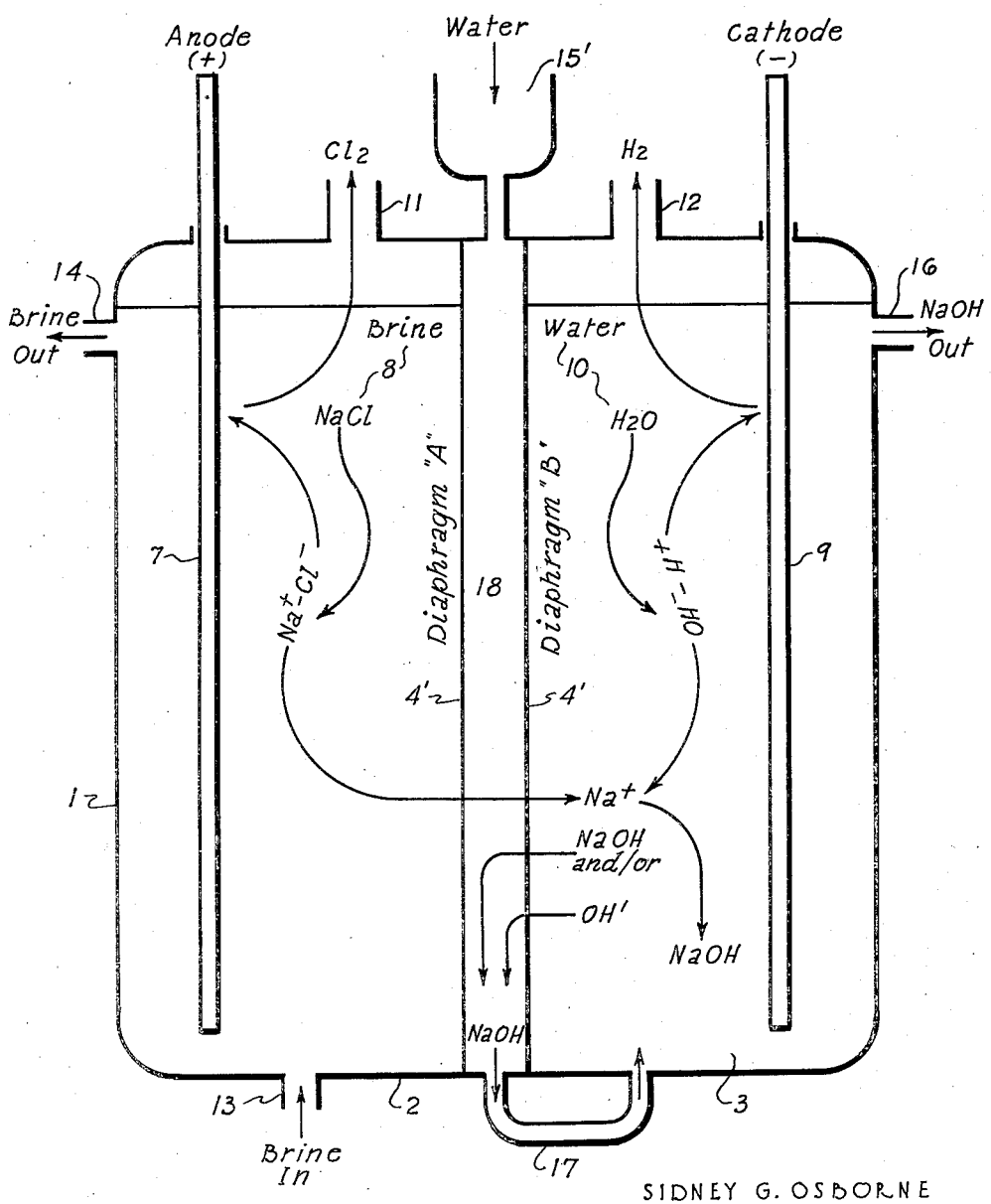

Sidney G. Osborne, Saint Davids, Ontario, Canada, and George T. Miller, Lewiston, N.Y., assignors to Hooker Chemical Corporation, Niagara Falls, N.Y., a corporation of New York Filed Jan. 23, 1952, Ser. No. 267,846

2 Claims. (Cl. 204—98)

This invention relates to electrolysis and more particularly to the use of diaphragms in connection with the electrolytic decomposition of chemical compounds, and the recovery of useful products therefrom.

The process of electrolysis comprises the decomposition of a chemical compound, either liquid, molten or in solution, between electrodes, by an electric current, and includes the local and spacial separation of the ions of an electrolyte and the transfer of their respective charges. Upon transferring their respective charges to the electrodes, one or more ions may form molecules of an element or combine with other available ions to form various chemical compounds. The practical and commercial application of electrolysis is concerned with the isolation and recovery of useful products appearing in the electrode compartments of an electrolytic cell as a result of the decomposition of a chosen ionized chemical compound by an electric current. The word "electrolyte" will be used hereinafter in the broader practical sense as applying to the liquid disposed between the electrodes in an electrolytic cell, whether it is the ionized compound being decomposed, in liquid form, molten form, or dissolved in a solvent, with or without other ions, contaminants, reaction products or additions.

During electrolysis positively charged ions are attracted to the negative electrode or cathode and negatively charged ions are attracted to the positive electrode or anode. Unless prevented, all species of ions present in the electrolyte take part in the transfer of the electric current in proportion to their number and speed of travel. It follows that if some useful product is generated at either electrode which is soluble in the electrolyte and is itself ionized, the ions so formed will take part in the transfer of electric current with the destruction, and loss of yield, of that particular product.

High current efficiency in an electrolytic process depends upon (1) keeping the electrode products from mixing by molecular migration caused by diffusion, convection currents, gas stirring, etc., and upon (2) preventing the consumption of electric current in the production of undesirable by-products caused by ionic migration. Molecular migration can be controlled in an electrolytic cell by interposing a porous diaphragm between the electrodes, thereby separating the cell into two compartments usually referred to as the anode compartment which contains the anolyte and the cathode compartment which contains the catholyte, but such a diaphragm has no substantial effect on ionic migration. Ionic migration has been controlled in diaphragm cells by causing the electrolyte to percolate through the diaphragm in a direction opposite to that in which certain migrating ions are traveling, and at a velocity equal to or greater than the velocity of migration, by which expedient the ions are washed back into the compartment from which they are migrating. However, the percolation of electrolyte necessary to produce the requisite velocity of flow is that under optimum operating conditions, it is seldom that more than fifty percent decomposition is attained, with the result that the desirable electrode product is heavily contaminated with undecomposed electrolyte.

It is the primary object of this invention to provide electrolytic cells of the diaphragm type and novel methods for electrolysis therefor, which overcome the difficulties encountered in segregating desirable products during the electrolytic decomposition of chemical compounds, without loss of the many advantages inherently connected therewith. It is also an object of this invention to form the diaphragm of such electrolytic cells of a material which precludes both molecular migration and undesirable ionic migration, but which still permits the conduction of electric current by the movement of the desirable ions. It is a particular object of this invention to employ such diaphragm material for the cell which will give high purity products in high yield in electrolytic decomposition systems wherein there may be a loss of electrical current and a loss of product yield due to undesirable ionic migration. These losses may result, for example, when the electrode products dissolve in the electrolyte or react with one or more of its components and then ionize thereby taking part in the transfer of electric current. Various other objects will become apparent to those skilled in the art on consideration of this specification and the appended claims.

These and related objects are accomplished in the present invention by simultaneously controlling both molecular and ionic migration during electrolysis by interposing, between the electrodes of an electrolytic cell, a diaphragm as a permselective membrane substantially impervious to liquids and gases, and, inert with respect to the electrolyte and products of electrolysis. The diaphragm, barrier, or septum of this invention is radically different from any previously used or known, in that it is not merely a mechanical contrivance but operates in essence, as a thin insoluble area or layer of the electrolyte, being composed of a material having the characteristics of an ionized salt pair, which is made up of an insoluble lattice structure, maintained rigid by an aggregate of relatively immobile ions of one charge, and through which ions of the opposite charge are free to move.

Among the materials which we have found applicable for our purposes are certain organic and inorganic salts such as ion exchange resins, zeolytes, and the like, all such materials being characterized by the fact that they are ionic in structure and have ions of one charge free to move, while the ions, or aggregate of ions, of the opposite charge are fixed in space.

It should be particularly pointed out that we have also found that by employing certain ion exchange materials in continuous or sheet form as diaphragms or barriers in electrolytic cells, in accordance with this invention, that the ion exchange materials operate, not on the basis of their well known ion exchange properties, but rather, on the novel basis of permitting a particular species of ion to pass through the diaphragm from one side to the other, in a stepwise process, from one active point in the resin to the next, under the propelling action of an electric current. We find this indeed surprising in view of the known properties of ion exchange resins.

In order that this invention may be more readily understood, it will be described with specific reference to certain preferred embodiments, and with reference to the electrolysis of an aqueous solution of sodium chloride whereby chlorine, caustic soda, and hydrogen are produced; however, it is not to be construed as limited thereto except as defined in the appended claims.

When sodium chloride brine is electrolyzed in a chlor-alkali cell, convection currents and gas evolution at the electrodes and other phenomena tend to bring together the alkali produced at the cathode and the chlorine produced at the anode, but this is prevented to a large extent by the use of a porous diaphragm which separates the cell into an anode and a cathode compartment. When using a nonpercolating porous diaphragm, the electrically charged ions in the electrolyte can move freely in either direction between the electrodes, except as they are attracted to a given electrode under the influence of the electric current. The result of this is that the caustic soda produced at the cathode ionizes to sodium ions and hydroxyl ions and although the positively charged sodium ions remain at, or in the vicinity of, the cathode, the negatively charged hydroxyl ions are attracted through the porous diaphragm to the anode where they start a series of objectionable reactions which lower the ampere efficiency of the cell and produce impurities which are included in the products. This objectionable movement of hydroxyl ions to the anode has been referred to as back-migration of hydroxyl ions. In order to counteract it, the electrolyte is usually caused to flow or percolate through the diaphragm at such a rate of flow that it washes the hydroxyl ions back into the cathode compartment. The brine or electrolyte flow so required for optimum commercial operation is such that only about fifty percent salt decomposition is possible and only a concentration of about twelve percent caustic soda can be produced. Moreover, by causing the brine to percolate through the diaphragm into the catholyte, the sodium chloride content of the caustic soda produced in the catholyte is of the order of 1300 to 1500 pounds of salt per 1000 pounds of caustic. Upon concentrating the cathode liquor produced by a percolating diaphragm cell, most of the salt is precipitated and can be removed by filtration. However, even upon evaporating to fifty percent caustic concentration, about eighteen to twenty pounds of salt per 1000 pounds of caustic remain. This product is too impure for many uses; consequently, it has been the practice to reduce the salt content by employing various expensive and cumbersome crystallization and solvent extraction procedures. If, on the other hand, using a porous diaphragm, percolation of the electrolyte is eliminated during electrolysis and the cathode compartment is filled with water, it will be found that a practically salt-free caustic will be produced but that the current efficiency of such a cell remains at approximately forty-five percent because about fifty-five percent of the current will be wasted by being carried by hydroxyl ions from the cathode to the anode irrespective of the caustic concentration.

In using the novel combination of this invention the passage of hydroxyl ions from the cathode to the anode is prevented, except as due to minor leakage effects, because the constitution of the diaphragm is such that only positive ions have freedom of motion through its structure. The following explanation is given in connection with Figures 1 and 2, which are diagrammatic drawings of electrolytic cells of this invention employing novel barriers which we have found useful in accordance with our invention. The electrolytic cells shown in the diagrams are illustrated for the electrolysis of sodium chloride, and the accompanying explanation is specific for said electrolysis, to make chlorine, hydrogen and caustic soda; however, it is to be understood that this invention is not limited to this specific embodiment.

Referring to Figure 1: The electrolytic cell comprises a vessel 1 separated into an anode compartment 2 and a cathode compartment 3 by a barrier, septum or diaphragm 4 substantially impervious to fluids and having an ionized lattice of mobile sodium ions 5 and stationary negative ions 6. The anode compartment contains an anode 7, in contact with sodium chloride brine 8, and the cathode compartment contains a cathode 9, in contact with water or caustic 10. The cell is of course provided with a chlorine exit 11 and a hydrogen exit 12, as illustrated in the drawing, and also contains a brine inlet 13, a brine outlet 14, a water inlet 15, a sodium hydroxide outlet 16, in addition to any other necessary accessories for the given electrolysis.

Referring to Figure 2, which is a diagrammatic sketch of another electrolytic cell of this invention employing two separate diaphragms: This electrolytic cell comprises the same essential parts described in connection with the cell shown in Figure 1, except that it has two separate diaphragms 4'A and 4'B, which are spaced to form a center compartment 18, having a water inlet 15', and a conduit 17 which is in communication with the cathode compartment.

When sodium chloride brine 8 is electrolyzed in the chlor-alkali cell illustrated in Figure 1 employing the novel barrier or diaphragm 4 of this invention which is substantially impervious to liquids and gases, and has a structure such that it operates as a solid ionized salt, said structure being maintained rigid by the charged network of negative ions, or aggregates of ions 6, electrically balanced by a number of positive ions 5 which are free to move in the structure, i.e., a cation active diaphragm. it will be found that when the cathode compartment 3 is filled with water 10, chloride ions will discharge at the anode 7, since they are attracted thereto, just as in cells employing a percolating diaphragm. However, predominantly only sodium ions 5 will penetrate the novel barrier or diaphragm 4 because only positive ions are free to move through it. These sodium ions enter into the cathode compartment 3 with the result that essentially salt-free caustic soda will be produced at the cathode 9. Also, when employing ideal diaphragms in accordance with this invention, hydroxyl ions are no longer free to carry current from the cathode to the anode, as they can do in cells employing ordinary diaphragms, because they are blocked by the negatively charged network 6 of the molecular structure of the diaphragm. The current will therefore be carried exclusively by sodium ions from the anode to cathode and the difficulties caused by back migration of hydroxyl ions are eliminated by the diaphragms of this invention.

Ionic solids are generally considered to be completely ionized with the ions subject to certain strong coulombic, attractive forces. Such forces can be diminished to the extent that one ion is capable of changing place with another by the presence of a highly polar medium or solvent, such as water. The practical utilization of the mobile properties of such ions therefore depends on the presence of a polar medium, generally water, in the pores of the solid. It follows therefore that in practice, even under the most perfect conditions, there can be a minor transfer of solvent through the diaphragm and a minor transfer of undesirable ions, particularly small high speed ions, such as the hydroxyl and hydronium ions. Such transfer causes a decrease in ampere efficiency, which under some circumstances may be important and in others entirely unimportant.

In accordance with this invention, these effects can be controlled, when necessary or desired, by using two diaphragms in the electrolytic cell as illustrated in Figure 2 and represented as Diaphragm A and Diaphragm B. For instance, in the production of chlorine, hydrogen and caustic soda, water is fed through inlet 15' into the center compartment 18, between the two diaphragms 4'A and 4'B, both being of ionic structure in accordance with this invention, and thence through conduit 17 into the cathode compartment 3. Under these conditions, if for example, twenty percent caustic soda is being produced at the cathode, the caustic soda concentration in the center compartment 18, which develops because of leakage and back migration, will only be about five percent or less and the cell will operate at the high ampere efficiency corresponding to a five percent caustic soda product rather than at the lower efficiency corresponding to 20 percent caustic soda product.

Instead of transferring the water or weak caustic soda solution, from the center compartment 18 to the cathode compartment 3, by way of conduit 17, diaphragm 4'B nearest the cathode can, if desirable, be porous or such that there is a slow percolation of electrolyte throughout the full area of the diaphragm, rather than being impervious to liquids as just described in connection with Figure 2. In either case the face of the primary ionic diaphragm A which separates the anolyte and catholyte, and therefore controls the ampere efficiency of the cell, is very largely protected from the strong caustic soda produced in the cathode compartment, so that migration and leakage effects are almost eliminated.

The same technique can be used in other electrolytic processes employing anion active diaphragms as the primary diaphragm, or, with a combination of anion active and cation active diaphragms.

In operating chlor-alkali cells using the novel diaphragms of this invention the anode compartment contains a substantially saturated brine solution and the cathode compartment contains water which is fed at a rate sufficient to produce caustic soda of the desired concentration or strength. The water may be fed to the cathode compartment so that it mixes with the caustic already produced, and being produced, thereby resulting in a continuous overflow of caustic of the desired strength, or, water may be caused to flow consecutively through a number of cells, or a number of cathode compartments in the same cell, thereby permitting a gradual increase in the concentration of caustic produced, or, if desirable two separated diaphragms may be employed with the water being fed in between them. This latter case is still further illustrated in Example II.

In the electrolysis of sodium chloride, passing carbon dioxide into the catholyte either in the cathode compartment or outside the cell results in the production of soda ash rather than caustic soda. This is further illustrated in Example III. In such processes which involve the absorption of a gas by one of the electrode products, such absorption may be arranged to take place either inside or outside of the cell. However, in all cases, the basic operation of the cell, and more particularly the diaphragm, is substantially the same.

Successful diaphragms for use in electrolysis of alkali chloride brines have been constructed using cation exchange resins of an "Amberlite" type which have been formed into continuous thin sheets. Such sheets are self-supporting, pliable, permselective membranes or pellicles which comprise a matrix—such as polyethylene or natural or synthetic rubber—having distributed intimately and uniformly therein particles of an insoluble, infusible cation-exchange resin in an amount equal to twenty-five percent to seventy-five percent of the total weight of the membrane and the particles being of such size as to pass through a U.S. Standard sieve No. 50. The degree of perfection attainable in operation when using such a diaphragm in electrolysis is a function of its tightness, or the number of macropores or leakage points occurring between the resin particles in the sheet or film. In a perfect diaphragm made from this material all the current would be carried from anode to cathode by positive sodium ions and none in the opposite direction by hydroxyl or other negative ions. In imperfect diaphragms some leakage occurs and the current efficiency is dependent to some extent on the concentration of caustic being produced. In operating the two diaphragm cells of this invention with the special diaphragm facing the anode and a porous diaphragm facing the cathode, with water in between them, a buffer zone is set up at the cathode side of the ion active diaphragm, and this materially reduces the undesirable effects of leakage. However, this expedient becomes less important when more perfect diaphragms are used and is unnecessary in many operations.

When employing the diaphragm cells of this invention in electrolyzing sodium chloride to make chlorine, hydrogen and caustic, caustic soda is easily produced containing only one-tenth pound of salt per 1000 pounds of caustic, whereas, with present percolating diaphragms, the caustic produced contains 1300 to 1500 pounds of salt per 1000 pounds of caustic. In a cell using a percolating diaphragm the caustic strength is generally about ten to twelve percent; and even at 100 percent salt decomposition, if that were practical, would only be about twenty-two percent; whereas, with a cell using a diaphragm in accordance with the present invention, caustic of a strength between thirty and forty percent can be readily produced.

As an illustrative instance a piece of cellophane was stretched as a diaphragm between a graphite anode and a steel cathode, to form two separate compartments of an electrolytic cell. The anode compartment was filled with concentrated sodium chloride brine and the cathode compartment was filled with water. An electric current was passed through the cell, whereupon the cellophane diaphragm was converted to sodium cellulose, and after a period of several minutes the catholyte was analyzed and found to contain ten grams of caustic soda per liter, without any trace of chlorides being present therein. Gas was evolved at both electrodes, with chlorine being liberated at the anode and hydrogen at the cathode. The sodium cellulose diaphragm, for this short period of operation thus performed in accordance with this invention. This is illustrated by the following examples which are not to be construed as limited.

*Example I*

A sheet of asbestos paper was soaked in a liquid resinous, thermosetting, sulfonated, phenol-formaldehyde condensate in the "B-stage," capable of further polymerizing to an insoluble infusible, cation exchange resin. The soaked sheet was wrapped around a steel cathode screen, bound in place, and heated for several hours at a temperature of about 160 degrees centigrade to effect a polymerization and hardening of the resin. The diaphragm so produced was employed in the electrolysis of sodium chloride brine in an electrolytic cell having a graphite anode and employing the steel screen as the cathode. When operating the cell at a current density of 60 amperes per square foot of diaphragm area and at a cell voltage of 3.7 volts, with saturated sodium chloride brine in the anode compartment and water in the cathode compartment, chlorine was liberated at the anode, hydrogen was liberated at the cathode, caustic soda was produced in the catholyte, and the following results were obtained:

| Operating Time | Grams of NaOH per Liter of Catholyte | Percent Current Efficiency | Pounds of NaCl per 1,000 pounds of NaOH |
|---|---|---|---|
| ½ hour | 40.0 | 82.5 | 1.04 |
| 1 hour | 61.6 | 79.8 | 1.28 |
| 2 hours | 104.8 | 78.3 | |
| 3 hours | 136.8 | 71.2 | |
| 4 hours | 172.8 | 69.4 | 2.32 |
| 5 hours | 200.8 | 65.7 | |

*Example II*

A steel screen cathode was separated from a graphite anode by two synthetic cation active diaphragms which were spaced about one-quarter inch apart. The diaphragm nearest the anode was a self-supporting, cationic, permselective membrane consisting of an intimate and uniform dispersion of particles of a cation-exchange resin in a matrix of polyethylene. The cation-exchange resin per se was a sulfonated copolymer of styrene and divinylbenzene. The diaphragm nearest the cathode was purposely chosen because it was slightly porous and operated as a tight, percolating diaphragm. Saturated sodium chloride brine was placed in the anode compartment of the electrolytic cell and water was placed in the center compartment. During electrolysis the water slowly passed (by electroosmosis) from the center compartment, through the diaphragm nearest the cathode and then over the steel cathode screen. The electrolysis was conducted for a period of about seventeen hours. A current density of 90 amperes per square foot was maintained on the diaphragm surface. The cell voltage was 4.1 volts at a temperature of about 50 degrees centigrade and a 3.65 volts at a temperature of about 80 degrees centigrade. The solution dripping off the cathode screen was collected and analyzed 265.6 grams of sodium hydroxide per liter; it contained no trace of salt. The theoretical quantity of sodium hydroxide for the current used during the electrolysis measured by a copper coulometer was 24.9 grams. Actually 16.44 grams of salt-free sodium hydroxide was recovered as a twenty percent pure caustic solution representing a current efficiency of about 67 percent.

*Example III*

Two graphite electrodes were separated by a sheet of the cation permselective pellicle described in Example II to form an electrolytic cell. The anode compartment was filled with saturated sodium chloride brine and the cathode compartment was filled with fifty cubic centimeters of saturated sodium carbonate containing 382 grams of sodium carbonate per liter. During the electrolysis which was effected at about room temperature for a period of about two hours, carbon dioxide was introduced into the cathode compartment. The current density calculated on the surface area of the diaphragm was 90 amperes per square foot and the cell voltage varied between 3.8 to 4.4 volts. Chlorine was produced at the anode and sodium carbonate was formed in the cathode compartment. The theoretical quantity of sodium carbonate for the current used during the electrolysis measured by a copper coulometer test was 7.68 grams. Actually 7.24 grams of sodium carbonate was produced representing a current efficiency of 94.2 percent. On analysis, the sodium carbonate produced was found to meet USP specifications in that it only contained 0.031 pound of salt per 100 pounds of carbonate. When the catholyte is saturated with sodium carbonate at the start of the run, the sodium carbonate produced during the run is precipitated and therefore can be recovered by a simple filtration.

The above examples represent a few typical operations that can be performed with the electrolytic cells of this invention but are not intended to limit the scope of the invention to such operations. When it is desired to control anions, an anion active diaphragm is used, and when both anions and cations are to be controlled, as in the electrolysis of sodium sulfate to produce sulfuric acid and caustic soda, an anion active diaphragm is placed opposite the anode and a cation active diaphragm opposite the cathode. A space or center compartment is left between the two diaphragms which is fed with the sodium sulfate solution to be electrolyzed, and the anode and cathode compartments are filled with water. At least one electrode may be in contact with the diaphragms. By operating an electrolytic cell of this invention in this manner using an anionic permselective diaphragm comprising a dispersion of an anion exchange resin dispersed in an inert matrix next to the anode and a cationic diaphragm comprising a dispersion of a cation-exchange resin dispersed in an inert matrix next to the cathode, we recovered ten percent sulfuric acid from the anode compartment and eighteen percent caustic soda from the cathode compartment.

We claim:

1. The method of producing the electrolytic decomposition of sodium chloride and producing chlorine and sodium hydroxide comprising introducing the sodium chloride and water into a multi-compartment electrolytic cell, said cell having an anode compartment receiving electrolyte and discharging chlorine and an anode in contact with said liquid electrolyte, and a cathode compartment receiving electrolyte and discharging sodium hydroxide and a cathode in contact with said liquid electrolyte; forming a membrane by combining a supporting material with an ion exchange resin dispersed therein and polymerized to an insoluble infusible condition, sealing the membrane to substantial impermeability to passage of liquids and gases and to ions of a given sign while passing ions of the opposite sign, being composed of material having the characteristics of an ionized salt pair, interposing said membrane between the electrode compartments, maintaining the membrane wet with electrolyte, impressing a decomposition voltage across said electrodes and recovering the chlorine and sodium hydroxide products of electrolysis so produced.

2. A method of producing the electrolytic decomposition of sodium chloride and producing chlorine and sodium hydroxide comprising forming a membrane by soaking a sheet of heat-resistant, fibrous material in a liquid intermediately polymerized ion-exchange resin to disperse said resin in said material, heating said soaked sheet at a temperature of about 160° C. to effect final polymerization and hardening of the ion-exchange resin to an insoluble infusible condition, sealing the membrane to substantial impermeability to passage of liquids and gases and to ions of a given sign while passing ions of the opposite sign, said ion-exchange resin being composed of material having the characteristics of an ionized salt pair, interposing said membrane between electrodes in a sodium chloride electrolytic cell, maintaining said membrane wet with electrolyte, impressing a decomposition voltage across said electrodes and recovering the chlorine and sodium hydroxide so produced.

References Cited in the file of this patent

UNITED STATES PATENTS

| 914,856 | Meyer | Mar. 9, 1909 |
| 1,126,627 | Gaus | Jan. 26, 1915 |
| 1,441,408 | Dow | Jan. 9, 1923 |
| 1,972,561 | Heubaum | Sept. 4, 1934 |
| 2,636,851 | Juda et al. | Apr. 28, 1953 |
| 2,636,852 | Juda et al. | Apr. 28, 1953 |

FOREIGN PATENTS

| 993,345 | France | Oct. 30, 1951 |

OTHER REFERENCES

"Helvetica Chimica Acta," vol. 23 (1940), pages 795–800, article by Meyer et al.

Meyer: Transactions of the Faraday Society, vol. 33 (1937), pages 1073 to 1081.